(12) United States Patent
Ishida (10) Patent No.: US 7,520,645 B2
(45) Date of Patent: Apr. 21, 2009

(54) VEHICULAR HEADLAMP AND CAR HEADLAMP

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 385 days.

(21) Appl. No.: 11/096,459

(22) Filed: Apr. 1, 2005

(65) Prior Publication Data

US 2005/0231971 A1    Oct. 20, 2005

(30) Foreign Application Priority Data

Apr. 2, 2004   (JP)   ............................. 2004-110287

(51) Int. Cl.
*B60Q 1/32*   (2006.01)
(52) U.S. Cl. ........................ 362/507; 362/540; 362/227; 362/517; 362/518; 362/521
(58) Field of Classification Search ................. 362/507, 362/540–545, 227, 800, 517, 518, 521, 522
See application file for complete search history.

(56) References Cited

U.S. PATENT DOCUMENTS

| | | | | |
|---|---|---|---|---|
| 6,210,024 B1 * | 4/2001 | Shida | ........................... | 362/345 |
| 6,634,778 B2 * | 10/2003 | Tatsukawa | ................... | 362/523 |
| 6,648,491 B2 * | 11/2003 | Tokida et al. | ................ | 362/245 |
| 6,808,307 B1 * | 10/2004 | Aslan et al. | .................. | 374/178 |
| 6,873,111 B2 * | 3/2005 | Ito et al. | ........................ | 315/82 |

FOREIGN PATENT DOCUMENTS

| | | |
|---|---|---|
| DE | 103 40 432 | 3/2004 |
| JP | 2002-231013 | 8/2002 |
| WO | WO-01/01038 | 1/2001 |

OTHER PUBLICATIONS

Patent Abstract of Japan, Publication No. 2002-231013, Publication Date Aug. 16, 2002, 2 pages.
German Office Action for patent application No. 10 2005 015 077.2-54, Dated Oct. 28, 2008, and English translation thereof, 10 pages.

* cited by examiner

*Primary Examiner*—Sandra L O'Shea
*Assistant Examiner*—Mark Tsidulko
(74) *Attorney, Agent, or Firm*—Osha • Liang LLP (57) ABSTRACT

A vehicular headlamp includes: a first light source module having semiconductor light emitting elements; a first optical member for applying light generated by the first light source module to an area of the light distribution pattern of the vehicular headlamp; a second light source module that has semiconductor light emitting elements and generates light having the brightness higher than that of the light of the first light source module; and a second optical member for applying the light generated by the second light source module to an area narrower than the area to which the light is applied by the first optical member.

6 Claims, 10 Drawing Sheets

VEHICULAR HEADLAMP AND CAR HEADLAMP

This application claims foreign priority based on Japanese patent application JP 2004-110287, filed on Apr. 2, 2004, the contents of which is incorporated herein by reference in its entirety.

BACKGROUND OF THE INVENTION

1. Field of the Invention

The present invention relates to a vehicular headlamp and a car headlamp. Particularly, the present invention relates to a headlamp used for a vehicle and a headlamp used for a car.

2. Description of the Related Art

In recent years, a lighting device for a vehicle that employs a semiconductor light emitting element such as an LED (Light Emitting Diode) has been known (for instance, see JP-A-2002-231013 (pages 2 to 6, FIGS. 1-13)). Further, it has been studied to use the semiconductor light emitting element such as the LED for a vehicular headlamp, for instance, in view of design. The vehicular headlamp needs to form a prescribed light distribution pattern from the viewpoint of safety. A light distribution pattern includes an area called a hot zone to be irradiated with light more brightly than other areas in the light distribution pattern.

In order to brightly irradiate the hot zone with light, a light source of high brightness is preferably used to condense the light having high luminous intensity to the hot zone and irradiate the hot zone with the light. To generate the light of the high brightness, the light source may allow the light having a large light flux to be generated. However, when a semiconductor light emitting element such as an LED generates the light having the large light flux, a light emitting efficiency may be sometimes deteriorated. Accordingly, the consumed power of a vehicular headlamp is undesirably increased.

SUMMARY OF THE INVENTION

Thus, it is an object of the present invention to provide a vehicular headlamp and a car headlamp that can solve the above-described problem. This object can be achieved by combining features described in independent clauses in claims. Further, dependent clauses specify more advantageous specific examples of the present invention.

In order to solve the above-described problem, according to a first aspect of the present invention, a vehicular headlamp comprises: a first light source module having at least one semiconductor light emitting element; a first optical member for applying light generated by the first light source module to an area of a light distribution pattern of the vehicular headlamp; a second light source module having at least one semiconductor light emitting element and generating light having the brightness higher than that of the light of the first light source module; and a second optical member for applying the light generated by the second light source module to an area narrower than the area to which the light is applied by the first optical member.

The above-described vehicular headlamp may further comprise: a first electric current source for supplying an electric current to the first light source module; and a second electric current source for supplying to the second light source module an electric current in which the current density of the electric current supplied to the semiconductor light emitting element provided in the second light source module is higher than the current density of the electric current supplied to the semiconductor light emitting element provided in the first light source module.

The semiconductor light emitting element of the second light source module may have a light emitting area smaller than that of the semiconductor light emitting element of the first light source module and the second electric current source may supply to the second light source module the electric current substantially equal to the electric current supplied to the first light source module by the first electric current source.

The semiconductor light emitting element of the second light source module may have an light emitting area substantially equal to that of the semiconductor light emitting element of the first light source module and the second electric current source may supply to the second light source module the electric current more than the electric current supplied to the first light source module by the first electric current source.

The first light source module may include a plurality of semiconductor light emitting elements connected in parallel and having substantially equal light emitting areas, the second light source module may include a plurality of semiconductor light emitting elements connected in series and having the substantially equal light emitting areas to those of the plurality of the semiconductor light emitting elements included in the first light source module and the second electric current source may supply to the second light source module the electric current substantially equal to the electric current supplied to the first light source module by the first electric current source.

According to a second aspect of the present invention, a car headlamp for applying a low beam used for a vehicle comprises: a first light source module having at least one semiconductor light emitting element; a first optical member for applying light generated by the first light source module to an area of the light distribution pattern of the vehicular headlamp; a second light source module having at least one semiconductor light emitting element and generating light having the brightness higher than that of the light of the first light source module; and a second optical member for applying the light generated by the second light source module to an area narrower than the area to which the light is applied by the first optical member.

In thee above-described summary of the invention, all features necessary for the present invention are not enumerated and the sub-combinations of the groups of the features may constitute the invention.

BRIEF DESCRIPTION OF THE DRAWINGS

FIG. 8 is a diagram showing one example of a detailed structure of a light source module 10a.

DETAILED DESCRIPTION OF THE INVENTION

Now, the present invention will be described below by way of embodiments. Below-described embodiments do not limit the invention defined in the claims. Further, all the combinations of features described in the embodiments are not necessarily essential for achieving the object of the present invention, that is, solving the problems.

Figure 1:
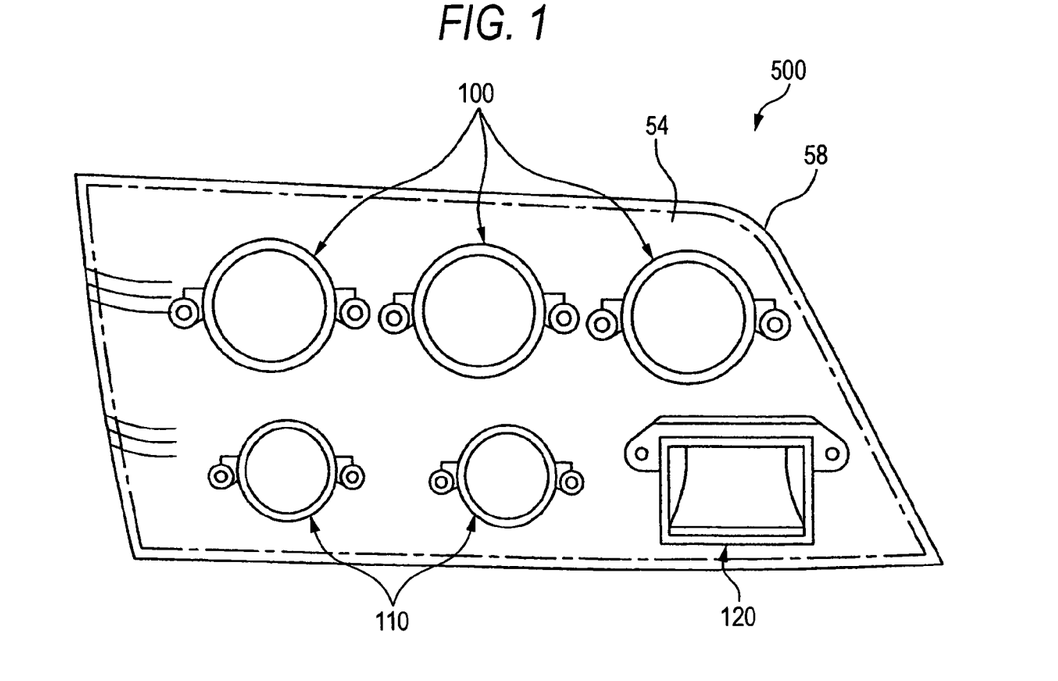
FIG. 1 is a front view of a headlight 500 for a vehicle.
Figure 2:
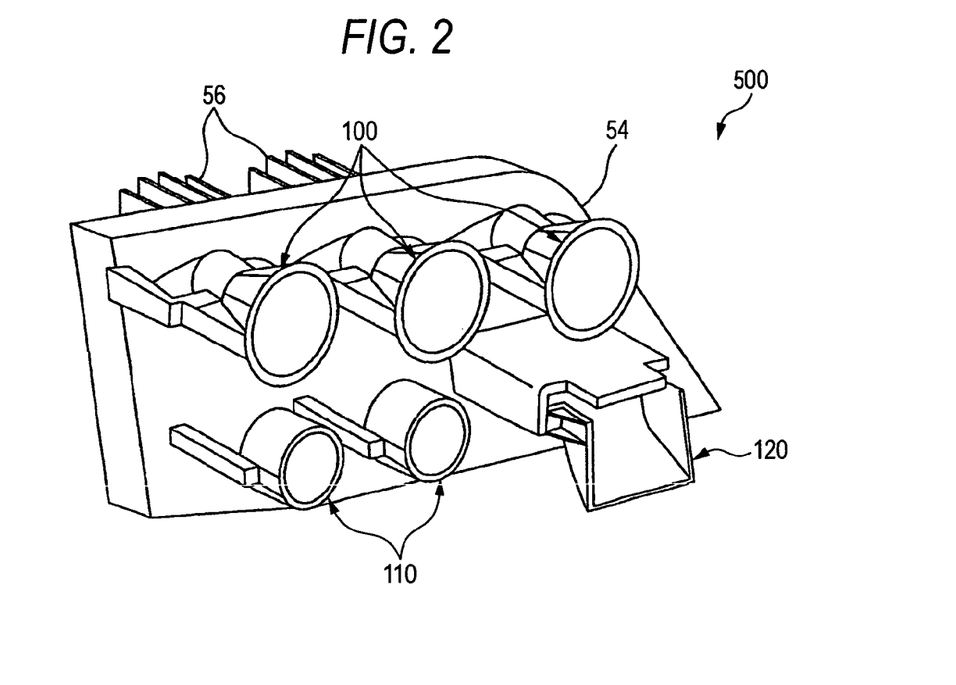
FIG. 2 is a perspective view of the headlight 500 for the vehicle viewed from an oblique and front part thereof.

FIGS. 1 and 2 show one example of a structure of a headlight 500 for a vehicle according to a first embodiment of the present invention. FIG. 1 is a front view of the headlight 500 for the vehicle. FIG. 2 is a perspective view of the headlight 500 for the vehicle viewing from an obliquely front part the headlight 500 for the vehicle from which a transparent cover 58 shown in FIG. 1 is removed. In this embodiment, forward and backward directions, rightward and leftward directions and upward and downward directions respectively correspond to the forward and backward directions, the rightward and leftward directions and the upward and downward directions of the vehicle.

The headlight 500 for the vehicle is, for instance, a vehicular headlamp for applying low beams. Light condensing units 100, intermediate diffusing units 110, and a large diffusing unit 120 are accommodated in a lamp chamber composed of the transparent cover 58 and a bracket 54. In this embodiment, the headlight 500 for the vehicle includes the three light condensing units 100, the two intermediate diffusing units 110 and one large diffusing unit 120.

The light condensing unit 100 has a round shape and emits light of a luminous intensity higher than that of the intermediate diffusing unit 110 and the large diffusing unit 120. The intermediate diffusing unit 110 has a round shape and a diameter smaller than that of the light condensing unit 100. The large diffusing unit 120 has a rectangular shape long in a transverse direction. The intermediate diffusing unit 110 and the large diffusing unit 120 emit lights of a luminous intensity lower than that of the light condensing unit 100, however, they have a light emitting efficiency higher than that of the light condensing unit 100. The light condensing unit 100, the intermediate diffusing unit 110 and the large diffusing unit 120 respectively have below-described semiconductor light emitting elements as light sources to irradiate the front part of the vehicle with the lights generated by the semiconductor light emitting elements. It is an object of this embodiment to provide a headlight 500 for a vehicle in which a prescribed area in the light distribution pattern of the vehicle is irradiated with light having a high luminous intensity and consumed power is low.

The light condensing units 100, the intermediate diffusing units 110 and the large diffusing unit 120 are respectively attached to the bracket 54 so as to be directed downward by about 0.5 to 0.6° relative to the front part of the vehicle. The bracket 54 is attached to the headlight 500 for the vehicle so as to tilt by an aiming mechanism for adjusting the directions of the optical axes of the light condensing units 100, the intermediate diffusing units 110 and the large diffusing unit 120. The light condensing units 100, the intermediate diffusing units 110 and the large diffusing unit 120 respectively have light distribution patterns so as to meet each kind to form a light distribution pattern required for the headlight 500 for the vehicle as a whole. On the back surface of the bracket 54, a plurality of heat sinks 56 is provided. The heat sinks 56 are made of a material having a thermal conductivity higher than that of a resin such as metal, ceramics, etc. to radiate heat generated respectively by the light condensing units 100, the intermediate diffusing units 110 and the large diffusing unit 120.

Figure 3:
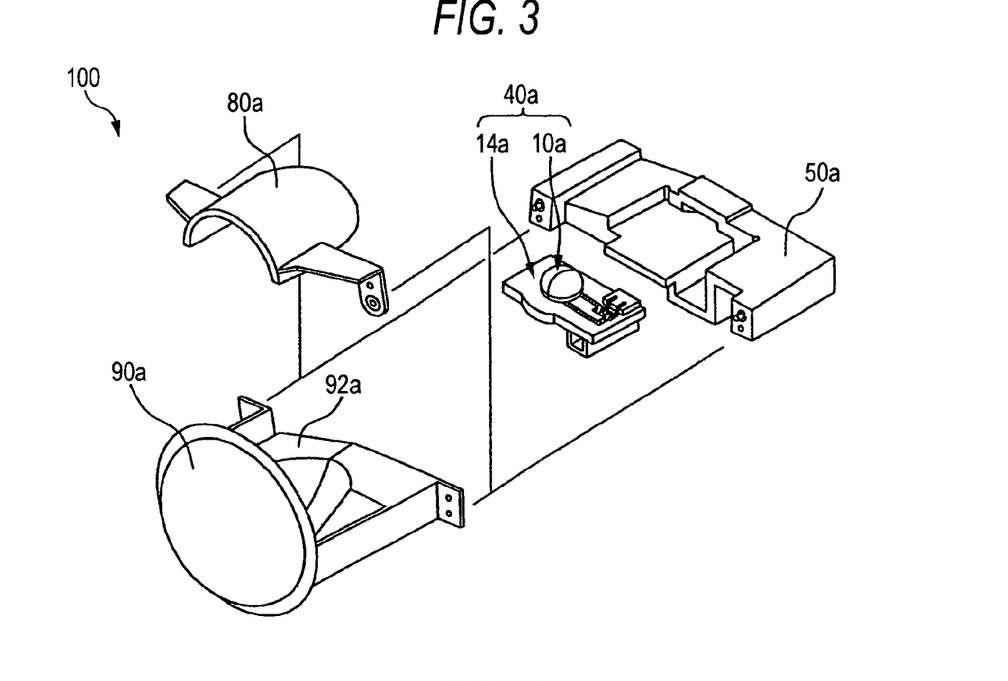
FIG. 3 is an exploded perspective view of a light condensing unit 100.

FIG. 3 is an exploded perspective view of the light condensing unit 100. The light condensing unit 100 is formed so as to concentrically apply light to a relatively narrow area of the light distribution pattern of the headlight 500 for the vehicle. The light condensing unit 100 includes a lens 90a, a shade 92a, a reflector 80a, a light source part 40a and a pedestal 50a. The light source part 40a has a light source module 10a and a base board 14a having an upper surface on which the light source module 10a is mounted. The pedestal 50a mounts the light source 40a thereon and fixes the lens 90a, the shade 92a and the reflector 80a relative to the light source module 10a.

The reflector 80a is a substantially dome-shaped member fixed to the upper part of the light source module 10a and has inside a substantially elliptic spherical reflecting surface having an optical axis of the light condensing unit 100 as a central axis. More specifically, the reflecting surface is formed in such a manner that a section including the optical axis of the light condensing unit 100 forms substantially ¼ as large as an elliptic form having one point separated rearward of the light source module 10a as a common top. With such a configuration, the reflector 80a condenses and reflects the light emitted from the light source module 10a near to the optical axis of the lens 90a toward the front part of the headlight 500 for the vehicle.

The shade 92a shields or reflects a part of the light reflected by the reflector 80a to allow beams of the light forming the light distribution pattern of the light condensing unit 100 to be incident on the lens 90a. The lens 90a allows a prescribed direction in the front part of the headlight 500 for the vehicle to be irradiated with the lights reflected by the reflector 80a and the shade 92a. In such a way, the reflector 80a, the lens 90a and the shade 92a allow the prescribed area of the light distribution pattern with the lights generated by the light source module 10a. The light source module 10a shows one example of a second light source module of the present invention and the reflector 80a, the lens 90a and the shade 92a show one example of a second optical member of the present invention.

Figure 4:
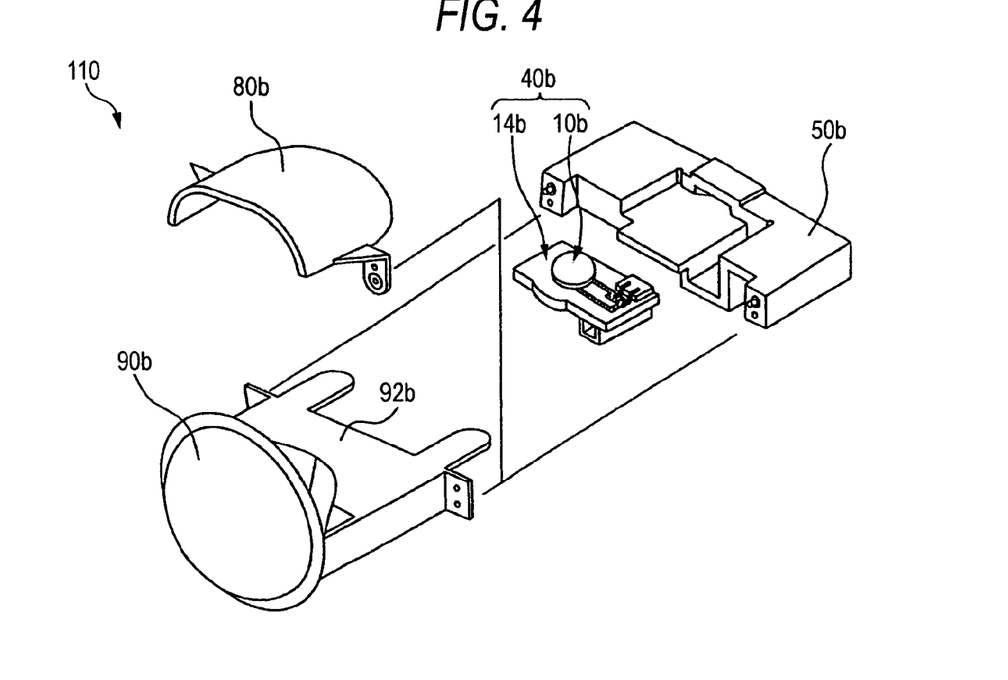
FIG. 4 is an exploded perspective view of an intermediate diffusing unit 110.

FIG. 4 is an exploded perspective view of the intermediate diffusing unit 110. The intermediate diffusing unit 110 includes a lens 90b, a shade 92b, a reflector 80b, a light source part 40b and a pedestal 50b. The light source part 40b has a light source module 10b and a base board 14b having an upper surface on which the light source module 10b is mounted. In the intermediate diffusing unit 110, the forms of the reflector 80b and the shade 92b are set so that the lights are applied to an area wider than the area of the light condensing unit 100 in the light distribution pattern of the headlight 500 for the vehicle. The relative positions of the reflector 80b, the lens 90b and the shade 92b are determined to the light source module 10b and they are fixed to the pedestal 50b. The light source module 10b shows one example of a first light source module of the present invention and the reflector 80b, the lens 90b and the shade 92b show one example of a first optical member.

Figure 5:
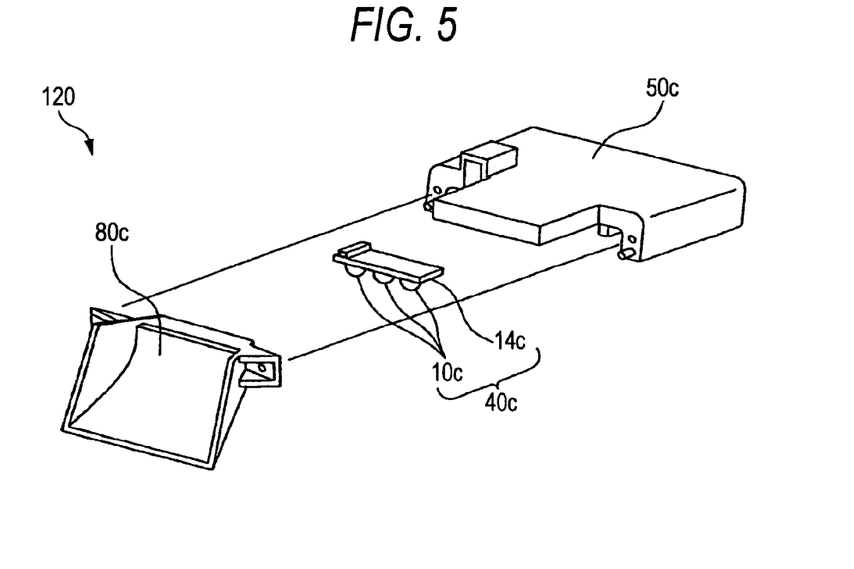
FIG. 5 is an exploded perspective view of a large diffusing unit 120.

FIG. 5 is an exploded perspective view of a large diffusing unit 120. The large diffusing unit 120 includes a reflector 80c, a light source part 40c and a pedestal 50c. The light source module 40c has a base board 14c on one surface of which a plurality of light source modules 10c are arranged in a line and mounted. The large diffusing unit 120 is formed so that an area the widest in the transverse direction of the light distribution pattern of the headlight 500 for the vehicle is irradiated with the lights. The pedestal 50c mounts thereon the elongated light source part 40c on which the plurality of the light source modules 10c are mounted so that the light source part 40c is extended downward and in the transverse direction. Thus, the reflector 80c allows the front part of the headlight 500 for the vehicle to be irradiated with the lights emitted downward by the light source modules 10c.

The inner reflecting surface of the reflector 80c is formed in a substantially parabolic shape in which a vertical cross-section in the forward and backward direction of the headlight 500 for the vehicle ranges in the entire area of the inner surface and a part that comes into contact with the pedestal 50c in the rear part of the light source modules 10c as the top of a major axis. With such a configuration, the reflector 80c allows the widest area in the transverse direction of the light distribution pattern of the headlight 500 for the vehicle with the lights from the plurality of the light source modules 10c arranged in the transverse direction, and vertically condenses the lights to a prescribed area narrower than the area in the transverse direction.

Figure 6:
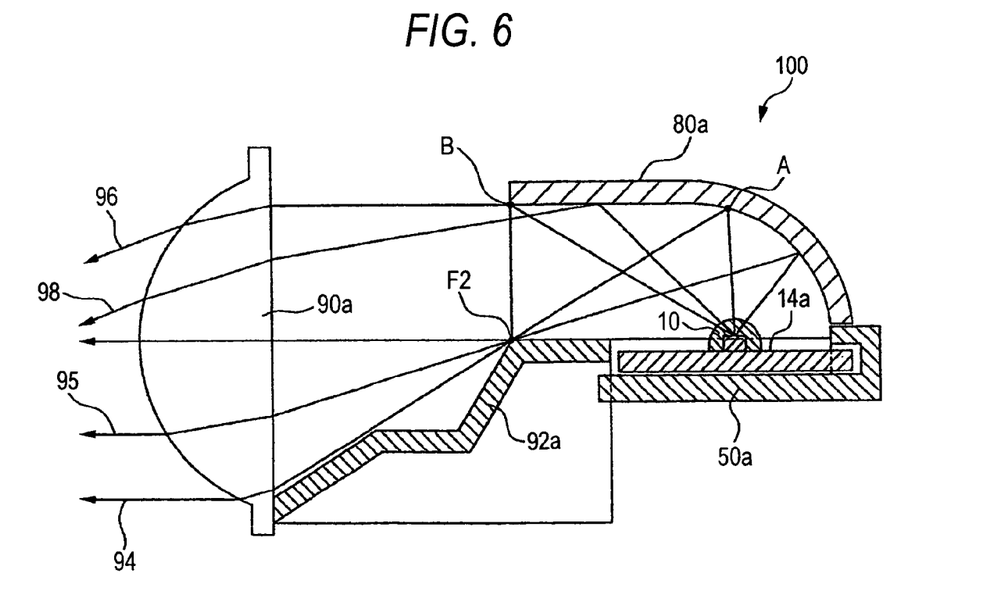
FIG. 6 is a sectional view showing one example of an optical path of the light condensing unit 100.

FIG. 6 is a sectional view showing one example of an optical path of the light condensing unit 100. The reflecting surface formed in the inner surface of the reflector 80a has its sectional form including the optical axis of the light condensing unit 100 configured in a substantially elliptic shape and its eccentricity is set so as to be gradually increased from the vertical cross-section to a horizontal section. In a vertical section including an optical axis, the lens 90a is disposed so that a focusing position F2 in the rear side corresponds to the focusing position of the reflecting surface of the reflector 80a. The reflector 80a condenses to the F2 the light of the light source module 10a on the reflecting surface rearward of a reflecting point A of a light 94 incident on the lower end of the lens 90a through F2. A light 95 that is reflected on the reflecting surface in the rear part of the reflecting point A of the reflector 80a and passes near the F2 is projected on an upper boundary of the light distribution pattern of the light condensing unit 100 by the lens 90a. On the other hand, a light 96 that is reflected on a reflecting point B of the reflector 80a is projected on a lower boundary of the light distribution pattern of the light condensing unit 100 by the lens 90a. A light 98 that is reflected between the reflecting points A and B of the reflector 80a is projected between the upper boundary and the lower boundary of the light distribution pattern of the light condensing unit 100 by the lens 90a. The shade 92a formed integrally with the lens 90a is provided with an edge descending downward from the F2. Thus, an optical image formed by the edge of the shade 92a and the reflector 80a on a focusing surface including the F2 is inverted by the lens 90a and the inverted optical image is projected on the front part of the headlight 500 for the vehicle.

The focal point of the reflector 80a in the horizontal direction is provided in a part nearer to the lens 90a side than to the F2. In the edge of the shade 92a including the F2, both sides viewed from an upper surface are curved forward correspondingly to the curve of an image surface of the reflector 80a, that is, the curve of the focusing surface in the transverse direction. Accordingly, the optical image formed on the edge forward of the F2 in accordance with the reflection of the reflector 80a is enlarged in the transverse direction by the lens 90 and inverted and projected.

Figure 7:
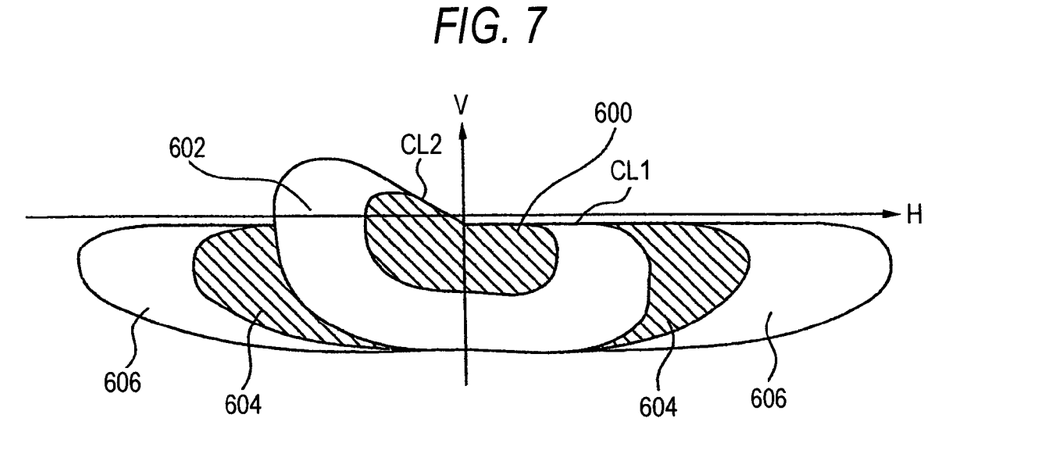
FIG. 7 is a diagram showing one example of a light distribution pattern of the headlight 500 for the vehicle.

FIG. 7 shows one example of the light distribution pattern of the headlight 500 for the vehicle. This light distribution pattern is a left low beam light distribution pattern formed on a virtual vertical screen disposed at a position of 25 m forward from the headlight 500 for the vehicle. The light distribution pattern is formed as the synthesized light distribution pattern of a first light distribution pattern 600 and a second light distribution pattern 602 formed by the light condensing unit 100, a third light distribution pattern 604 formed by the intermediate diffusing unit 110 and a fourth light distribution pattern 606 formed by the large diffusing unit 120. The light distribution pattern includes, on its upper end, a horizontal cut line CL1 and an oblique cut line CL2 for determining a vertical shading boundary.

The horizontal cut line CL1 is set slightly downward (directed downward by about 0.5 to 0.6°) with respect to the front surface (an intersection of a horizontal axis H and a vertical axis V) of the headlight 500 for the vehicle. The oblique cut line CL2 is inclined leftward and upward by about 15° from the intersection of the vertical axis V and the CL1. The horizontal cut line CL1 of the first light distribution pattern 600 is formed by the horizontal edges of the shades 92a and 92b. The oblique cut line CL2 is formed by the inclined edges of the shades 92a and 92b.

A part near the intersection of the horizontal axis H and the vertical axis V in the light distribution pattern is referred to as a hot zone. The hot zone is preferably more brightly lighted than other areas of the light distribution pattern from the viewpoint of safety. In this embodiment, the light condensing unit 100 uses the light of the light source module 10a that generates the light of brightness higher than that of the intermediate diffusing unit 110 and the large diffusing unit 120 to irradiate the first light distribution pattern 600 as an area narrower than the areas which are irradiated with lights by the intermediate diffusing unit 110 and the large diffusing unit 120 with the light having a high luminous intensity. Therefore, the headlight 500 for the vehicle can brightly light the hot zone. Accordingly, since the headlight 500 for the vehicle can more brightly light an area that is to be noticed during driving a vehicle, the safety during driving the vehicle at night can be improved.

Figure 8:
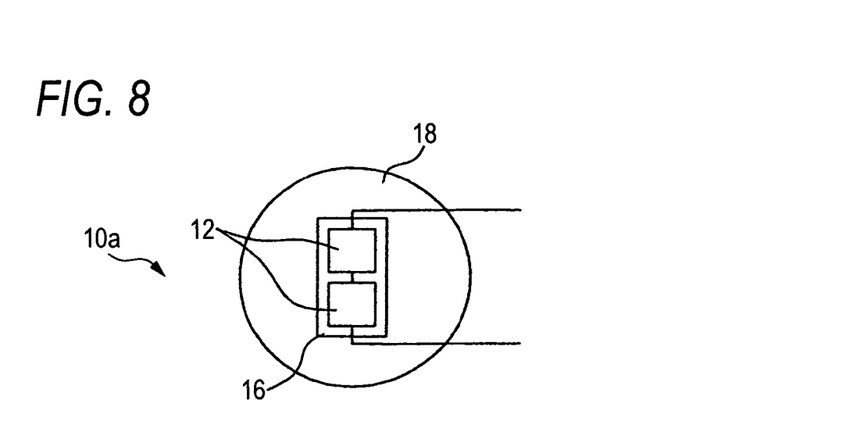
Figure 9:
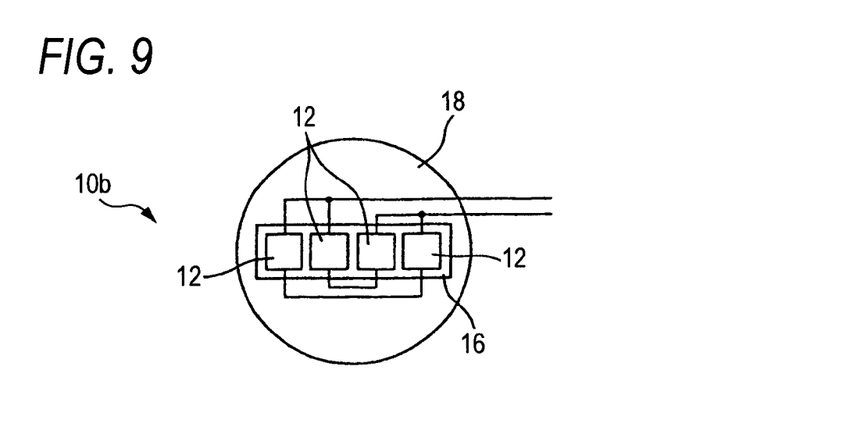
FIG. 9 is a diagram showing one example of a detailed structure of a light source module 10b.
Figure 10:
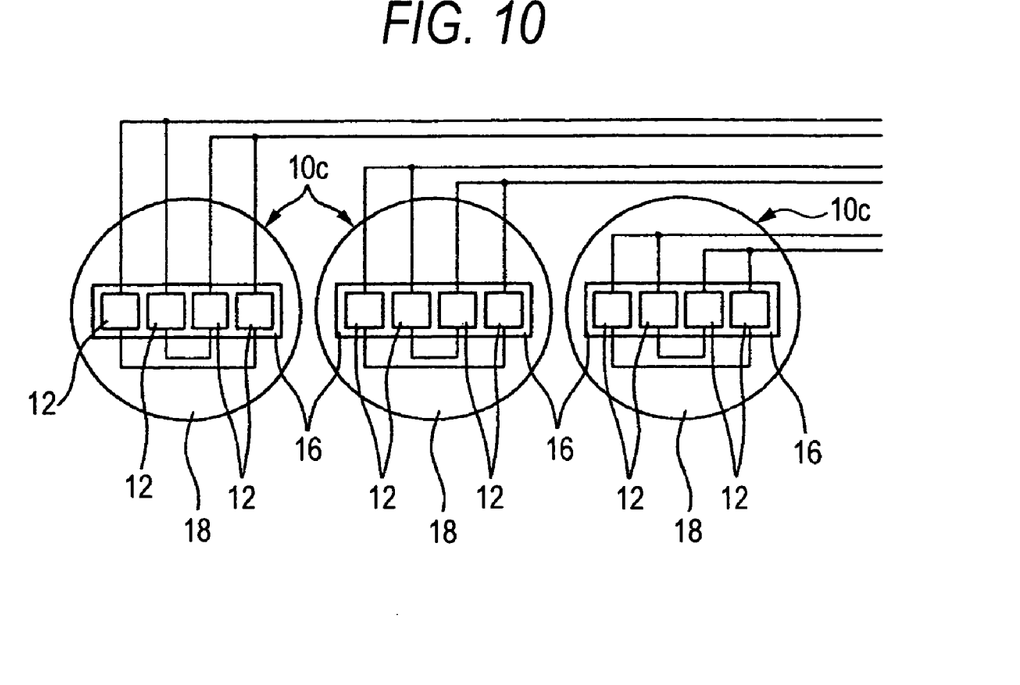
FIG. 10 is a diagram showing one example of a detailed structure of a light source module 10c.

FIGS. 8, 9 and 10 respectively show one example of the detailed structures of the light source modules 10a, 10b and 10c. Each of the light source modules 10a, 10b and 10c includes a plurality of semiconductor light emitting elements 12, a fluorescent member 16 and a mold 18. The semiconductor light emitting element 12 is an LED having a light emitting area of, for instance, about 1 mm square and is provided on a base board 14. The semiconductor light emitting element 12 generates, for instance, a blue light, in accordance with electric power received outside the light source modules 10a, 10b and 10c. The fluorescent member 16 is formed so as to cover the surfaces of the semiconductor light emitting elements 12 therewith and generates an yellow color light as a complementary color of the blue color light in accordance with the blue lights generated by the semiconductor light emitting elements 12. In this case, the light source modules 10a, 10b and 10c generate white color lights in accordance with the blue color lights and the yellow color lights respectively generated by the semiconductor light emitting elements 12 and the fluorescent members 16. In other case, the semiconductor light emitting elements 12 may generate ultraviolet rays relative to the fluorescent member 16. In this case, the fluorescent member 16 may generate a white color light in accordance with the ultraviolet rays.

The mold 18 seals the semiconductor light emitting elements 12 and the fluorescent member 16. The mold 18 is formed in, for instance, a semi-spherical shape with a material such as a light transmitting resin that transmits the lights generated by the semiconductor light emitting elements 12 and the fluorescent member 16. The mold 18 may be formed with a material having a refractive index higher than that of air so as to cover the light emitting surface of the fluorescent member 16 therewith. Thus, the lights generated by the semiconductor light emitting elements 12 and the fluorescent member 16 can be efficiently taken out and utilized.

In this embodiment, the light source module 10a includes two semiconductor light emitting elements 12 having substantially equal light emitting areas. The two semiconductor light emitting elements 12 provided in the light source module 10a are connected in series to each other. Here, a connection means not only a physical connection, but also an electric connection. The light source modules 10b and 10c respectively include four semiconductor light emitting elements 12 having light emitting areas substantially equal to the light emitting areas of the semiconductor light emitting elements 12 provided in the light source module 10a. When the plurality of the semiconductor light emitting elements 12 provided in the light source modules 10b and 10c are mounted on the vehicle, the semiconductor light emitting elements are arranged so as to be horizontally disposed in the transverse direction of the vehicle. In the four semiconductor light emitting elements 12 respectively provided in the light source modules 10b and 10c, the sets of the semiconductor light emitting elements that are respectively connected in series are connected in parallel.

In this case, when the semiconductor light emitting elements 12 have the substantially equal light emitting areas, as electric current supplied to the semiconductor light emitting elements 12 increases, the semiconductor light emitting elements generate the lights of larger light flux. Further, when the light emitting areas are equal, if the generated light flux increases, the luminous intensity as the light flux per unit solid angle is increased. At the time, the brightness as the luminous intensity per unit area is also increased. Accordingly, when the electric current substantially equal to that of the light source modules 10b and 10c is supplied to the light source module 10a, the light source module 10a generates the light of the brightness higher than that of the light source modules 10b and 10c. Thus, the light source modules 10a, 10b and 10c can be treated as the light source module 10 whose rated forward current is substantially equal. Here, the rated forward current indicates electric current supplied to the light source modules 10a, 10b and 10c to light respectively the light source modules 10a, 10b and 10c with desired quantities of light.

As described above, the headlight 500 for the vehicle can use a current source for outputting the electric current having a single current value to light the light source modules 10a, 10b and 10c that generate the lights of different brightness. Accordingly, parts such as socket terminals or cables having the substantially same current capacity can be employed. Therefore, the headlight 500 for the vehicle can be constructed at low cost. Further, since the light source modules 10a, 10b and 10c that generate the light of the different brightness can be constructed by using the substantially same semiconductor light emitting elements 12, the light source modules 10 can be constructed at low cost.

Figure 11:
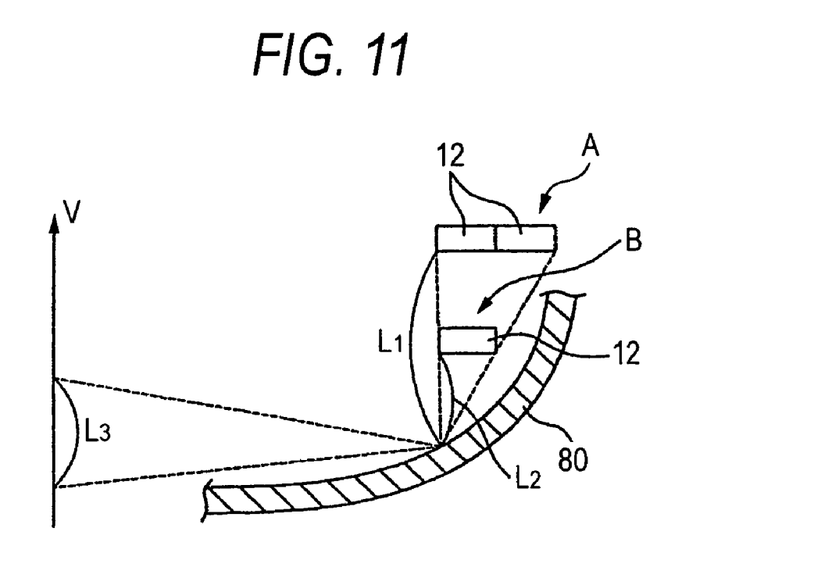
FIG. 11 is a vertical sectional view showing the relation of the arrangement of semiconductor light emitting elements 12 of the light source modules 10b and 10c and the distance between the semiconductor light emitting elements 12 and a reflector 80.

FIG. 11 is a vertically sectional view showing the relation of the arrangement of the semiconductor light emitting elements 12 of the light source modules 10b and 10c and the distance between the semiconductor light emitting elements and a reflector 80. A transverse direction in this figure shows the forward and backward direction of the vehicle. The reflector 80 forms from the lights generated by the semiconductor light emitting elements 12 a light distribution pattern having the length of $L_3$ in the vertical direction and elongated in the transverse direction of the vehicle on a virtual vertical screen disposed at a position 25 m forward the headlight 500 for the vehicle. Here, when the semiconductor light emitting elements 12 of the light source modules 10b and 10c are arranged in such a way that the semiconductor light emitting elements are disposed horizontally in the forward and backward direction of the vehicle, for instance, as shown by A, the distance between the semiconductor light emitting elements 12 and the reflector 80 is $L_1$. However, in this embodiment, when the plurality of the semiconductor light emitting elements 12 of the light source modules 10b and 10c are mounted on the vehicle, the semiconductor light emitting elements are arranged horizontally in the transverse direction of the vehicle, as shown by B. Thus, the distance between the semiconductor light emitting elements 12 and the reflector 80 is $L_2$ shorter than $L_1$. Therefore, the size of the intermediate diffusing units 110 and the large diffusing unit 120 can be made to be small.

Figure 12:
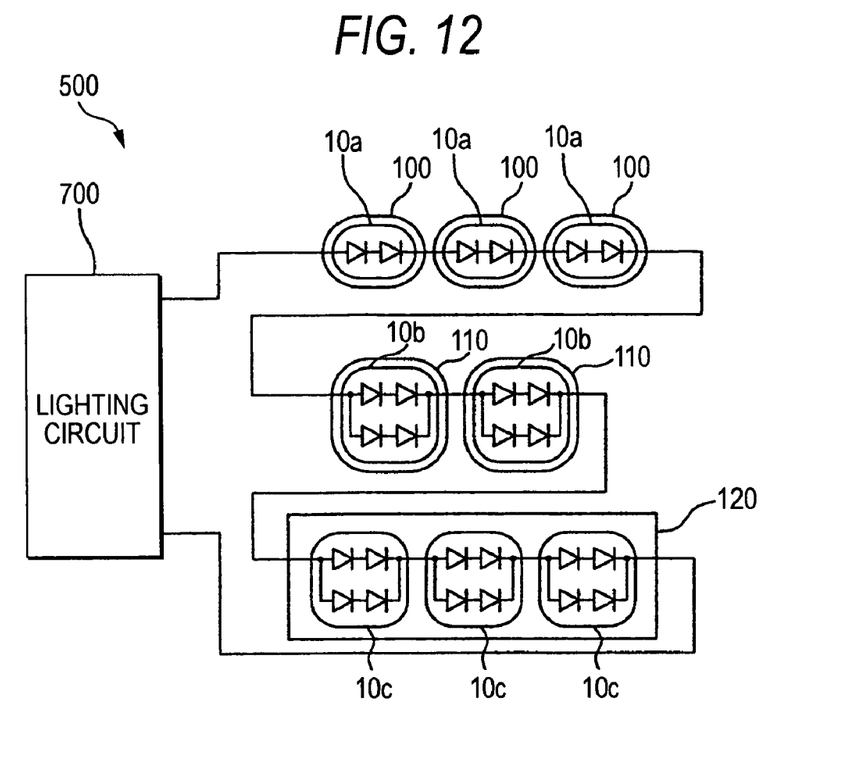
FIG. 12 is a diagram showing one example of a connection of the headlight 500 for the vehicle in a first embodiment.

FIG. 12 shows one example of a connection of the headlight 500 for the vehicle in the first embodiment. The headlight 500 for the vehicle includes a lighting circuit 700 as well as the light condensing units 100, the intermediate diffusing units 110 and the large diffusing unit 120. The light condensing units 100, the intermediate diffusing units 110 and the large diffusing unit 120 are connected together in series. The lighting circuit 700 supplies a substantially equal electric current to the light condensing units 100, the intermediate diffusing units 110 and the large diffusing unit 120 that are connected in series. In such a connection, the lighting unit 700 supplies the electric current to the light condensing units 100 so that the current density of the electric current supplied to the semiconductor light emitting elements 12 of the light condensing units 100 is higher than the current density of the electric current supplied respectively to the semiconductor light emitting elements 12 of the intermediate diffusing units 110 and the large diffusing unit 120.

Here, when the lighting circuit 700 supplies the electric current of, for instance, 700 mA to the light condensing units 100, the intermediate diffusing units 110 and the large diffusing unit 120 that are connected in series, the electric current of 700 mA is supplied respectively to the semiconductor light emitting elements 12 of the light condensing units 100. The electric current of 350 mA is supplied respectively to the semiconductor light emitting elements 12 of the intermediate diffusing units 110 and the large diffusing unit 120. Thus, the semiconductor light emitting elements 12 of the light condensing units 100 respectively generate the lights having the brightness higher than that of the semiconductor light emitting elements 12 of the intermediate diffusing units 110 and the large diffusing unit 120. In such a way, the light source modules 10 that generate the lights of different brightness can be lighted by using a single wiring, so that the number of the wiring of the headlight 500 for the vehicle can be reduced. Accordingly, the headlight 500 for the vehicle can be miniaturized.

Further, when any of the light source modules 10a, 10b and 10c is disconnected, the headlight 500 for the vehicle does not light. Thus, the headlight 500 for the vehicle can inform a driver that any of the light source modules 10a, 10b and 10c of the headlight 500 for the vehicle is disconnected. A lighting circuit 700 shows one example of a first electric current source and a second electric current source of the present invention.

Figure 13:
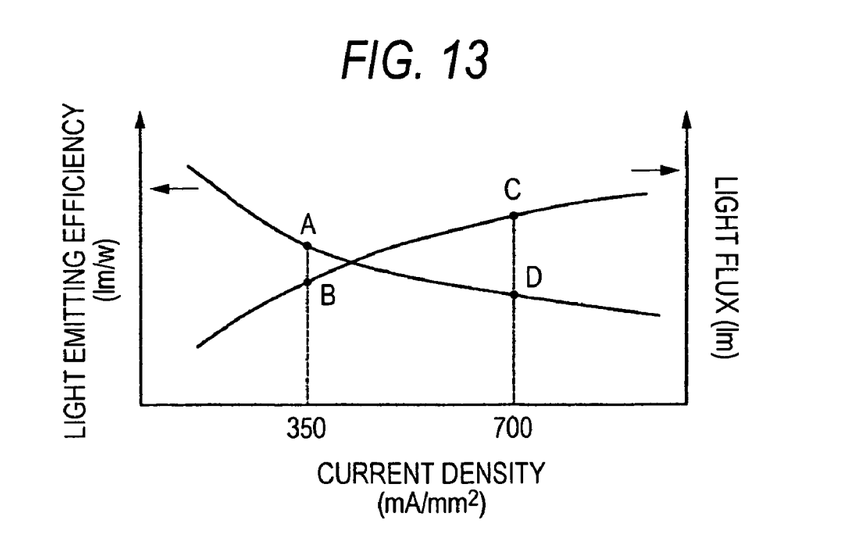
FIG. 13 is a diagram showing one example of the relation between a light flux and a light emitting efficiency relative to the current density of the semiconductor light emitting element 12.

FIG. 13 shows one example of the relation of a light flux and a light emitting efficiency relative to the current density of the semiconductor light emitting element 12. When the current density of the semiconductor light emitting element 12 is increased, the light flux generated by the semiconductor light emitting element 12 is increased. On the other hand, the light emitting efficiency is lowered. Assuming that the light emitting area of the semiconductor light emitting element 12 in this embodiment is, for instance, 1 mm square, when the electric current of 700 mA is supplied, the light emitting efficiency of the semiconductor light emitting element 12 has a value shown by a point D. On the other hand, when the electric current of 350 mA is supplied, the light emitting efficiency of the semiconductor light emitting element 12 has a value shown by a point A and is higher than that when the electric current of 700 mA is supplied. Further, when the electric current of 350 mA is supplied, the light flux of the light generated by the semiconductor light emitting element 12 has a value shown by a point B. On the other hand, when the electric current of 700 mA is supplied, the light flux of the light generated by the semiconductor light emitting element 12 has a value shown a point C and is higher than that when the electric current of 350 mA is supplied. Here, when the semiconductor light emitting elements 12 have the substantially same light emitting areas, if the generated light fluxes are different, the luminous intensity as the light flux per unit solid angle is different and the brightness as the luminous intensity per unit area is also different at the same time. Accordingly, in the semiconductor light emitting elements 12 having the substantially same light emitting areas, the semiconductor light emitting element 12 to which a large quantity of electric current is supplied emits the light whose brightness is higher than that of the semiconductor light emitting element 12 to which a small quantity of electric current is supplied.

In this embodiment, the light source modules 10a, 10b and 10c include the semiconductor light emitting elements 12 having the substantially equal light emitting areas. Since a larger quantity of electric current is supplied to the semiconductor light emitting elements 12 of the light source module 10a than that supplied to the semiconductor light emitting elements 12 of the light source modules 10b and 10c, the light source module 10a generates the lights having the brightness higher than that of the light source modules 10b and 10c. Further, the light condensing units 100 concentrically apply the lights generated by the light source modules 10a to a relatively narrow area of the light distribution pattern. The intermediate diffusing units 110 and the large diffusing unit 120 diffuse and apply the lights generated by the light source modules 10b and 10c to relatively wide areas of the light distribution pattern. Accordingly, the light condensing units 100 apply the lights having the luminous intensity higher than that of the lights applied by the intermediate diffusing units 110 and the large diffusing unit 120.

The light source modules 10a, 10b and 10c have the semiconductor light emitting elements 12 having the substantially equal light emitting areas. Since a smaller quantity of electric current is supplied to the semiconductor light emitting elements 12 of the light source modules 10b and 10c than that supplied to the semiconductor light emitting elements 12 of the light source module 10a, the light emitting efficiency of the light source modules 10b and 10c is higher than that of the light source module 10a. Thus, the light emitting efficiency of the intermediate diffusing units 110 and the large diffusing unit 120 can be increased more than that of the light condensing units 100. Consequently, the hot zone can be irradiated with the lights having the high luminous intensity and the headlight 500 for the vehicle low in its consumed electric power can be formed.

Figure 14:
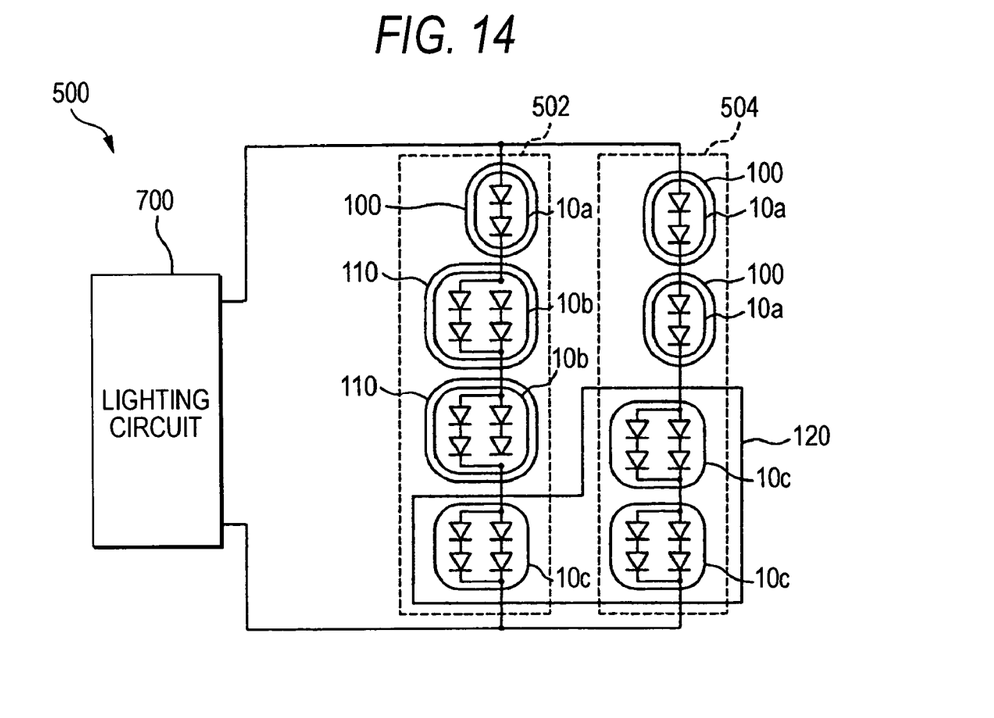
FIG. 14 is a diagram showing another example of the connection of the headlight 500 for the vehicle in the first embodiment.

FIG. 14 shows another example of a connection of the headlight 500 for the vehicle in the first embodiment. The headlight 500 for the vehicle includes a light source line 502 in which one light condensing unit 100, two intermediate diffusing units 110 and one light source module 10c of the large diffusing unit 120 are connected in series and a light source line 504 in which two light condensing units 100 and two light source modules 10c in the large diffusing unit 120 are connected in series. The lighting circuit 700 independently supplies electric power respectively to the light source line 502 and the light source line 504. Thus, even when any of the light source modules 10 included in one light source line of the light source line 502 and the light source line 504 is disconnected, the front part of the vehicle can be irradiated with the other light source line. Accordingly, a safety of a vehicle traveling at night can be maintained. Further, the output voltage of the lighting circuit 700 can be lowered more than that when the headlight 500 for the vehicle is realized by a single wiring. Therefore, the lighting circuit 700 can be constructed at low cost and a user can be prevented from receiving an electric shock.

Further, the light source line 502 and the light source line 504 preferably include a plurality of kinds of light source units so as to irradiate the substantially entire part of the light distribution pattern therewith. Thus, even when any of the light source modules 10 included in one light source line of the light source line 502 and the light source line 504 is disconnected, the substantially entire part of the light distribution pattern of the vehicle can be irradiated with the other light source line. Further, the rated forward voltage of the light source modules 10 is preferably substantially equal. Here, the rated forward voltage designates voltage respectively generated in the light source modules 10a, 10b and 10c when the light source modules 10a, 10b and 10c are respectively lighted with desired quantities of light. Thus, for example, only when the number of the plurality of the light source modules 10 connected to the light source line 502 or 504 is the same, the light source modules 10 included in the light source line 502 can be replaced by the light source modules 10 included in the light source line 504. Accordingly, after the positions of the light source modules 10 in the headlight 500 for the vehicle are set from the viewpoint of a design or an optical design, the wiring of each of the light source modules 10 can be easily made.

In this embodiment, the light source modules 10a, 10b and 10c respectively have the different number of semiconductor light emitting elements 12 that respectively have substantially equal light emitting areas. The plurality of the semiconductor light emitting elements 12 provided in the light source module are connected in series to each other. The plurality of the semiconductor light emitting elements 12 provided in the light source modules 10b and 10c are connected in parallel with each other. As compared therewith, as another example, the light source modules 10a, 10b and 10c may respectively have one semiconductor light emitting element 12 and the light emitting area of the semiconductor light emitting element 12 of the light source module 10a may be smaller than the light emitting areas of the semiconductor light emitting elements 12 of the light source modules 10b and 10c. Even in such a structure, when a lighting circuit 700 supplies a substantially equal electric current to the light source modules 10a, 10b and 10c, the light source module 10a can emit the light of brightness higher than that of the light source modules 10b and 10c.

Further, as a still another example, the light source modules 10a, 10b and 10c may respectively have one semiconductor light emitting element 12 having a substantially equal light emitting area. A lighting circuit 700 may supply a larger quantity of electric current to the light source module 10a than that of an electric current supplied to the light source modules 10b and 10c. In this case, the light source module 10a can also generate the light of brightness higher than that of the light source modules 10b and 10c.

As a still another example, the light source modules 10a, 10b and 10c may respectively have a plurality of semiconductor light emitting elements 12 that respectively have substantially equal light emitting areas. The number of the plurality of the semiconductor light emitting elements 12 provided in the light source module 10a may be larger than that of the plurality of the semiconductor light emitting elements 12 respectively provided in the light source modules 10b and 10c and may be connected in series. The plurality of the semiconductor light emitting elements 12 respectively provided in the light source modules 10b and 10c may be connected in parallel. Even in this structure, when a lighting circuit 700 supplies a substantially equal electric current to the light source modules 10a, 10b and 10c, the light source module 10a can also emit the light of brightness higher than that of the light source modules 10b and 10c.

Figure 15:
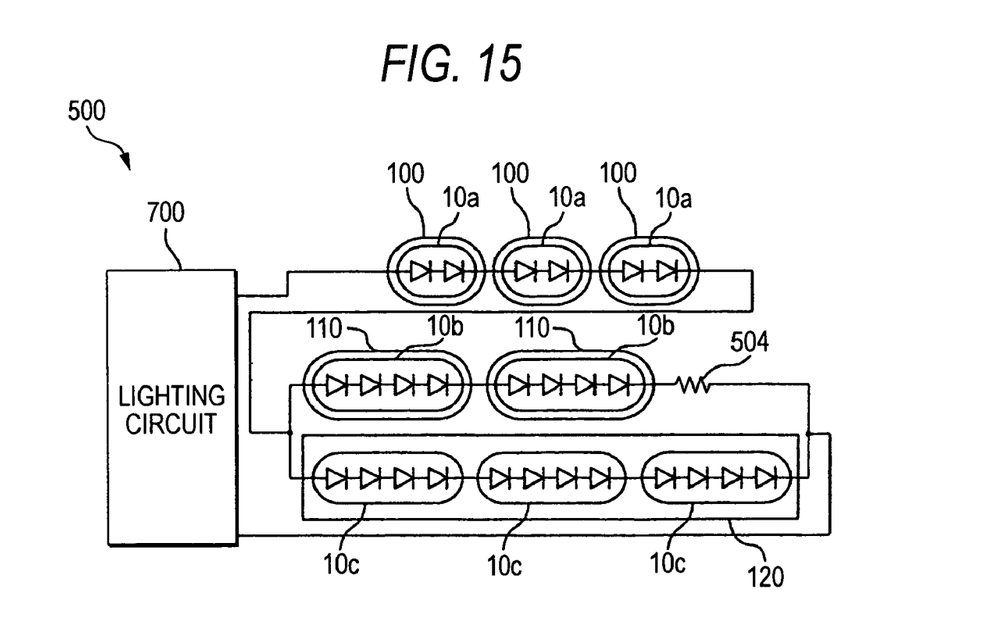
FIG. 15 is a diagram showing a still another example of the connection of the headlight 500 for the vehicle in the first embodiment.

FIG. 15 shows a still another connection of the headlight 500 for the vehicle in the first embodiment. The headlight 500 for the vehicle further includes a resistance 140. In this embodiment, four semiconductor light emitting elements 12 respectively provided in the light source modules 10b and 10c are connected together in series. Three light source modules 10c of the large diffusing unit 120 are connected together in series. The two intermediate diffusing units 110 and the resistance 140 are connected together in series. The two intermediate diffusing units 110 and the resistance 140 that are connected together in series are connected in parallel with one large diffusing unit 120. Three light condensing units 100 are connected together in series. The light condensing units 100 are connected in series to the large diffusing unit 120. Here, the resistance value of the resistance 140 is set so that a value of an electric current supplied to the intermediate diffusing units 110 is substantially equal to that of an electric current supplied to the large diffusing unit 120. In this embodiment, since the plurality of the light source modules 10 for generating the lights of different brightness can be lighted by the small number of wiring, the headlight 500 for the headlight can be miniaturized.

Figure 16:
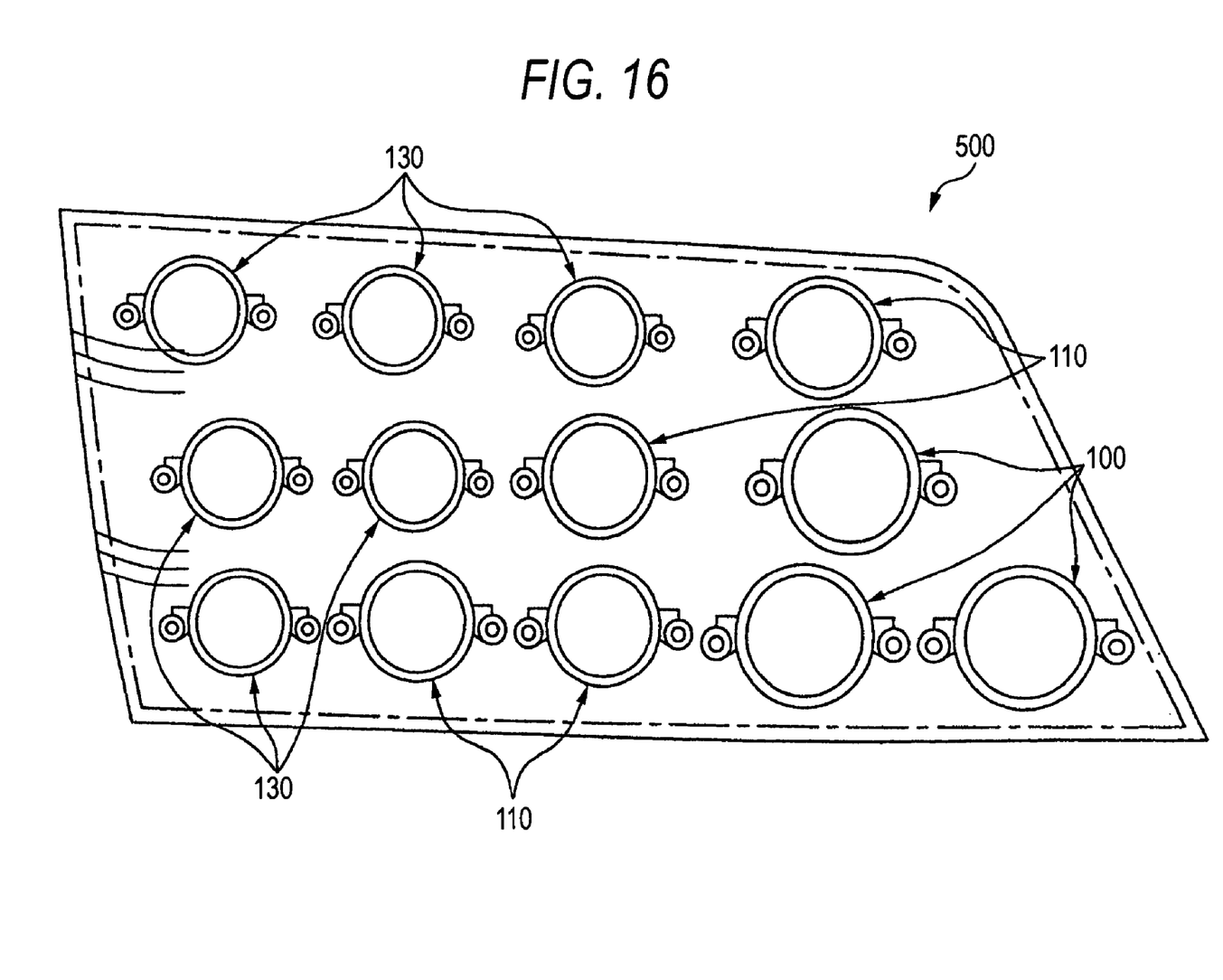
FIG. 16 is a front view showing one example of a structure of a headlight 500 for a vehicle according to a second embodiment of the present invention.

FIG. 16 is a front view showing one example of a structure for a headlight 500 for a vehicle according to a second embodiment of the present invention. In FIG. 16, structures designated by the same reference numerals as those of FIG. 1 have the same structures as those shown in FIG. 1 or similar functions except below-described points. Therefore, an explanation of them is omitted. In this embodiment, the headlight 500 for the vehicle includes three light condensing units 100, four intermediate diffusing units 110 and six large diffusing units 130. The large diffusing unit 130 is round and has a diameter smaller than the diameter of the intermediate diffusing unit 110. The large diffusing unit 130 emits light having a luminous intensity lower than that of the light condensing unit 100, however, has a light emitting efficiency higher than that of the light condensing unit 100. The six large diffusing units 130 are constructed so as to form the fourth light distribution pattern 606 (see FIG. 7) that is the widest area in the transverse direction in the light distribution pattern.

Figure 17:
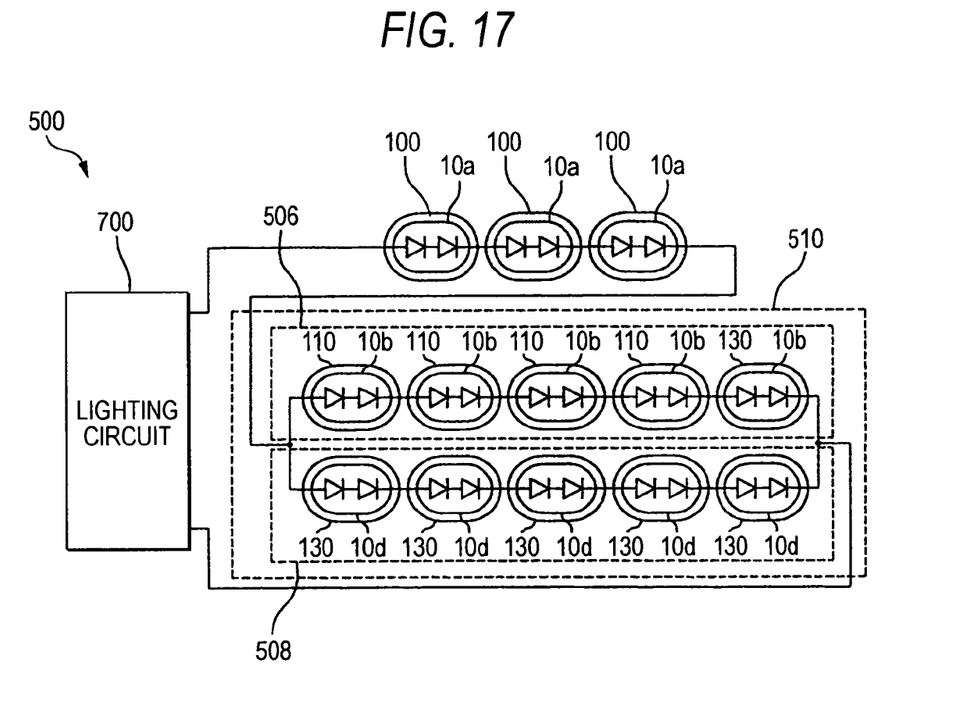
FIG. 17 is diagram showing one example of a connection of the headlight 500 for the vehicle in the second embodiment.

FIG. 17 shows one example of a connection of the headlight 500 for the vehicle in the second embodiment. In FIG. 17, structures designated by the same reference numerals as those of FIG. 12 have the same structures as those shown in FIG. 12 or similar functions to those shown in FIG. 12 except below-described points. Therefore, an explanation of them is omitted. A light source line 506 includes four intermediate diffusing units 110 and one large diffusing unit 130 that are connected together in series. A light source line 508 includes five large diffusing units 130 that are connected together in series. A light source line 510 includes the light source line 506 and the light source line 508 that are connected in parallel with each other. Three light condensing units 100 that are connected together in series are connected in series to the light source line 510. The large diffusing units 130 include light source modules 10d. A light source module 10a, a light source module 10b and the light source module 10d respectively have two semiconductor light emitting elements 12 that are connected together in series. In this embodiment, when a rated forward electric current is supplied respectively to the intermediate diffusing units 110 and the large diffusing units 130, a voltage drop is substantially equal. Accordingly, when the rated forward electric current is supplied respectively to the light source line 506 and the light source line 508, the voltage drop is substantially equal. Thus, an electric current supplied to the semiconductor light emitting elements 12 provided in the light condensing units 100 is two times as much as an electric current supplied to the semiconductor light emitting elements 12 respectively provided in the intermediate diffusing units 110 and the large diffusing units 130. Therefore, the light source module 10a generates the light of brightness higher than that of the light source modules 10b and 10d. Consequently, in this embodiment, since the plurality of the light source modules 10 for emitting the lights of different brightness can be likewise lighted by the small number of wiring, the headlight 500 for the vehicle can be miniaturized.

Figure 18:
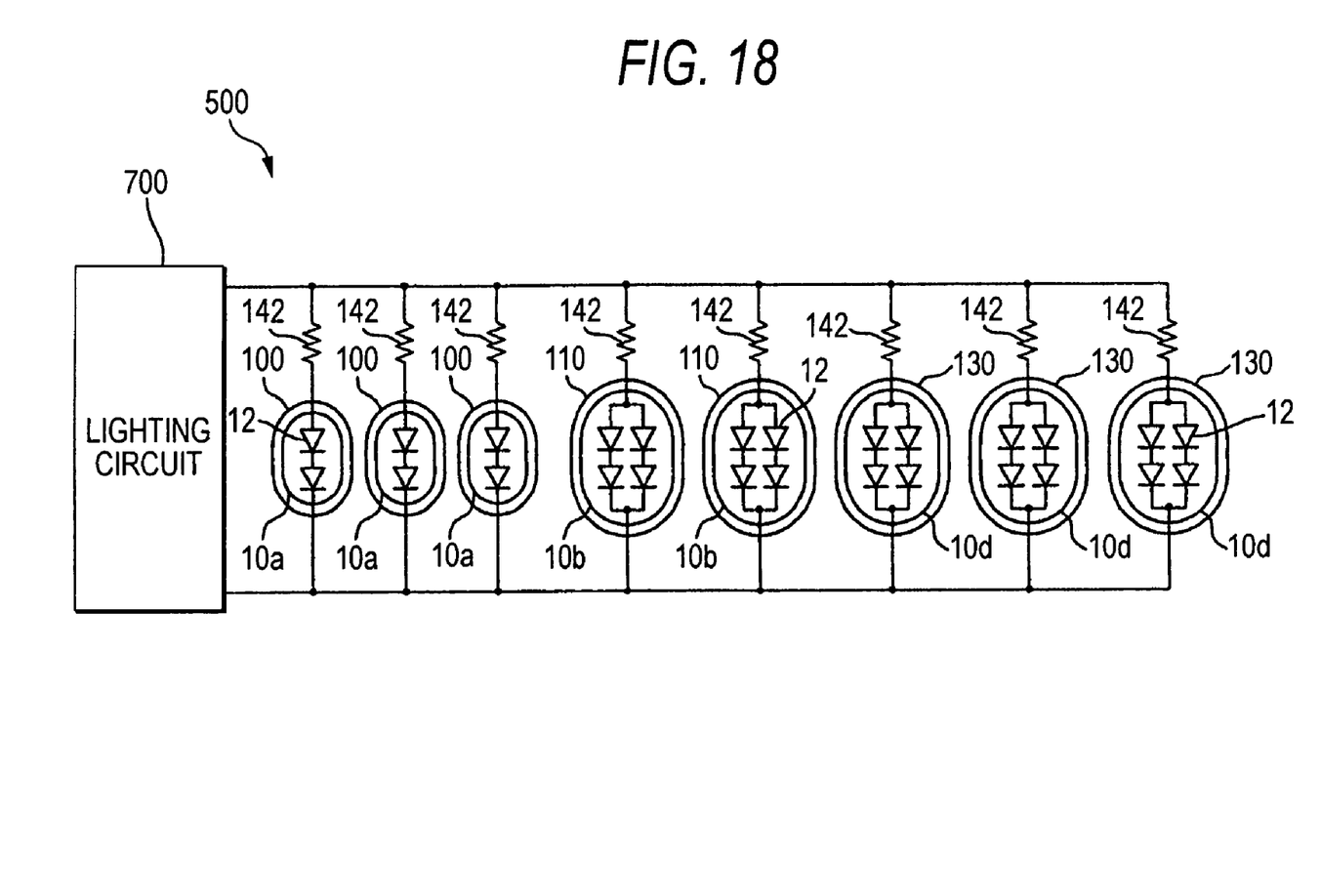
FIG. 18 is a diagram showing one example of a connection of a headlight 500 for a vehicle in a third embodiment of the present invention.

FIG. 18 shows one example of a connection of a headlight 500 for a vehicle in a third embodiment of the present invention. In FIG. 18, structures designated by the same reference numerals as those of FIG. 12 have the same structures as those shown in FIG. 12 or similar functions to those shown in FIG. 12 except below-described points. Therefore, an explanation of them is omitted. The headlight 500 for the vehicle includes three light condensing units 100, two intermediate diffusing units 110 and three large diffusing units 130. In each of the light condensing units 100, the intermediate diffusing units 110 and the large diffusing units 130, one end is connected to a reference potential terminal of a lighting circuit 700 and the other end is connected to a positive potential terminal of the lighting circuit 700 through a resistance 142. The large diffusing units 130 have light source modules 10d. The resistance values of the resistances 142 are respectively set so that when rated voltage for turning on the light source modules 10 with desired quantities of light is applied to the light source modules by the lighting circuit 700, the light source modules 10 are respectively maintained to rated forward voltage by a voltage drop generated in the resistances 142 in accordance with a rated forward electric current supplied respectively to the light source modules 10. The light source module 10a has two semiconductor light emitting elements 12 that are connected in series to each other. The light source modules 10b and 10d respectively have four semiconductor light emitting elements. One two semiconductor light emitting elements that are connected in series are connected in parallel with the other two semiconductor light emitting elements that are connected in series. The light emitting areas of the semiconductor light emitting elements 12 respectively provided in the light source modules 10a, 10b and 10d are substantially equal. Further, in this embodiment, the rated forward voltage generated when the rated forward electric current is supplied respectively to the light source modules 10a, 10b and 10d is substantially equal.

Here, when the rated voltage is applied respectively to the light source modules 10a, 10b and 10d through the resistances 142, a larger quantity of electric current is supplied to the semiconductor light emitting elements 12 provided in the light source modules 10a than that of an electric current supplied to the semiconductor light emitting elements 12 provided in the light source modules 10b and 10d. Since the light emitting areas of the semiconductor light emitting elements of the light source modules 10 are substantially equal, the light source modules 10a generate the lights of brightness higher than that of the lights generated from the light source modules 10b and 10d. Thus, the lighting circuit 700 for generating single voltage is used so that the plurality of the light source modules 10 for generating the lights of different brightness can be lighted. Accordingly, the wiring of the headlight 500 for the vehicle can be reduced. Further, since the rated forward voltage is substantially equal when the rated forward electric current is supplied respectively to the light source modules 10, the voltage drop respectively generated in the resistances 142 can be decreased. Therefore, the output voltage of the lighting circuit 700 can be lowered near to the rated forward voltage of the light source modules 10. Consequently, the lighting circuit 700 can be formed at low cost and a user can be prevented from receiving an electric shock.

In this embodiment, the headlight 500 for the vehicle is provided with the plurality of the light source units for applying the lights having two kings of luminous intensity. However, as another example, a plurality of light source units for applying lights having three kinds or more of luminous intensity may be provided. Thus, a light distribution pattern can be more highly accurately formed.

As apparent from the above description, according to this embodiment, the headlight 500 for the vehicle can be provided in which the hot zone in the light distribution pattern of the vehicular headlamp can be irradiated with the light having the high luminous intensity and the consumed power is low.

The present invention is described above by referring to the embodiments. However, the technical scope of the present invention is not limited to the scope defined by the above-described the embodiments. It is to be understood to a person with ordinary skill in the art that various changes or improvements may be applied to the above-described embodiments. As apparent from the description of claims, forms including such changes and improvements may be included in the technical scope of the present invention.

What is claimed is:

1. A vehicular headlamp comprising:
   a first light source module having at least one semiconductor light emitting element;
   a first optical member configured to apply light generated by the first light source module to an area of a light distribution pattern of the vehicular headlamp;
   a second light source module having at least one semiconductor light emitting element that generates light having the brightness higher than that of the light of the first light source module; and
   a second optical member for configured to focus the light generated by the second light source module to an area on the light distribution pattern of the vehicular lamp smaller than the area to which the light is applied by the first optical member.

2. The vehicular headlamp according to claim 1, further comprising:
   an electric current source for supplying an electric current to the first light source module and to the second light source module an electric current in which the current density of the electric current supplied to the semiconductor light emitting element provided in the second light source module is higher than the current density of the electric current supplied to the semiconductor light emitting element provided in the first light source module.

3. The vehicular headlamp according to claim 2, wherein the semiconductor light emitting element of the second light source module has a light emitting area smaller than that of the semiconductor light emitting element of the first light source module and the electric current source supplies to the second light source module the electric current substantially equal to the electric current supplied to the first light source module by the electric current source.

4. The vehicular headlamp according to claim 2, wherein the semiconductor light emitting element of the second light source module has a light emitting area substantially equal to that of the semiconductor light emitting element of the first light source module and the electric current source supplies to the second light source module the electric current more than the electric current supplied to the first light source module by the electric current source.

5. The vehicular headlamp according to claim 2, wherein the first light source module includes a plurality of semiconductor light emitting elements connected in parallel and having substantially equal light emitting areas, the second light source module includes a plurality of semiconductor light emitting elements connected in series and having the substantially equal light emitting areas to those of the plurality of the semiconductor light emitting elements included in the first light source module and the electric current source supplies to the second light source module the electric current substantially equal to the electric current supplied to the first light source module by the electric current source.

6. A car headlamp for applying a low beam used for a car comprising:
   a first light source module having at least one semiconductor light emitting element;
   a first optical member configured to apply light generated by the first light source module to an area of a light distribution pattern of the vehicular headlamp;
   a second light source module having at least one semiconductor light emitting element that generates light having the brightness higher than that of the light of the first light source module; and
   a second optical member configured to focus the light generated by the second light source module to an area on the light distribution pattern of the vehicular lamp smaller than the area to which the light is applied by the first optical member.

\* \* \* \* \*